United States Patent [19]

Andrews

[11] 4,207,769
[45] Jun. 17, 1980

[54] CHANGE OF ANGULAR ACCELERATION SENSOR

[75] Inventor: H. Eugene Andrews, Simi Valley, Calif.

[73] Assignee: Hughes Aircraft Company, Culver City, Calif.

[21] Appl. No.: 927,695

[22] Filed: Jul. 24, 1978

[51] Int. Cl.² ............................................. G01P 15/08
[52] U.S. Cl. .................................... 73/517 A; 324/125
[58] Field of Search ............. 73/517 A, 517 R, 516 R, 73/505; 324/162, 125, 146, 151 A, 154 R; 340/671

[56] References Cited

U.S. PATENT DOCUMENTS

| | | | |
|---|---|---|---|
| 2,560,257 | 7/1951 | Sias | 324/125 |
| 2,942,476 | 6/1960 | Turner | 73/517 A |
| 3,983,478 | 9/1976 | Pearson | 324/125 X |

FOREIGN PATENT DOCUMENTS 150166 of 1962 U.S.S.R. ............................... 73/517 A

*Primary Examiner*—Jerry W. Myracle
*Attorney, Agent, or Firm*—Allen A. Dicke, Jr.; W. H. MacAllister

[57] ABSTRACT

The change of angular acceleration sensor has a wire wound rotor resiliently mounted for rotation about a sensing axis and has a magnetic field at right angles to the sensing axis and across the wound rotor so that a signal voltage is generated in the windings by the motion of the windings in the field in accordance with the third time derivitive of angular motion of the sensor about its sensing axis.

3 Claims, 8 Drawing Figures

CHANGE OF ANGULAR ACCELERATION SENSOR

BACKGROUND OF THE INVENTION

This invention is directed to a change of angular acceleration sensor which is sensitive to changes in angular rate of acceleration about a sensitive axis, and produces a minimum output signal as a result of changes in rate of accelerations along or around another axis.

Accelerometers which are sensitive to angular accelerations around a sensitive axis are well-known. These accelerometers sense an angular acceleration about a rotational axis when they are positioned with their sensitive axes in a suitable orientation for sensing the angular acceleration. Such accelerometers utilize combinations of linear motion sensors to detect the resultant angular rotational motion.

SUMMARY OF THE INVENTION

In order to aid in the understanding of this invention, it can be stated in essentially summary form that it is directed to a sensor which senses the rate of angular acceleration about a sensitive axis. The sensor comprises a rotor which is resiliently mounted for rotational displacement about the rotational sensitive axis to sense the first time derivitive or change in rate of rotary acceleration about that axis. The rotor carries half of a coil-magnet system. The other half of the system is fixedly mounted on the rotor support. Changes in angular acceleration move the winding with respect to the magnet to produce a signal voltage.

It is accordingly an object of this invention to provide a sensor for sensing changes in rate of angular acceleration about an axis. It is a further object to provide such a sensor which is practically insensitive to linear accelerations and to accelerations about other axes. It is a further object to provide a sensor which is economic and is constructed to have high reliability.

Other objects and advantages of this invention will become apparent from the study of the following portion of the specification, the claims and the attached drawings.

DESCRIPTION OF THE PREFERRED EMBODIMENT

Figure 1:
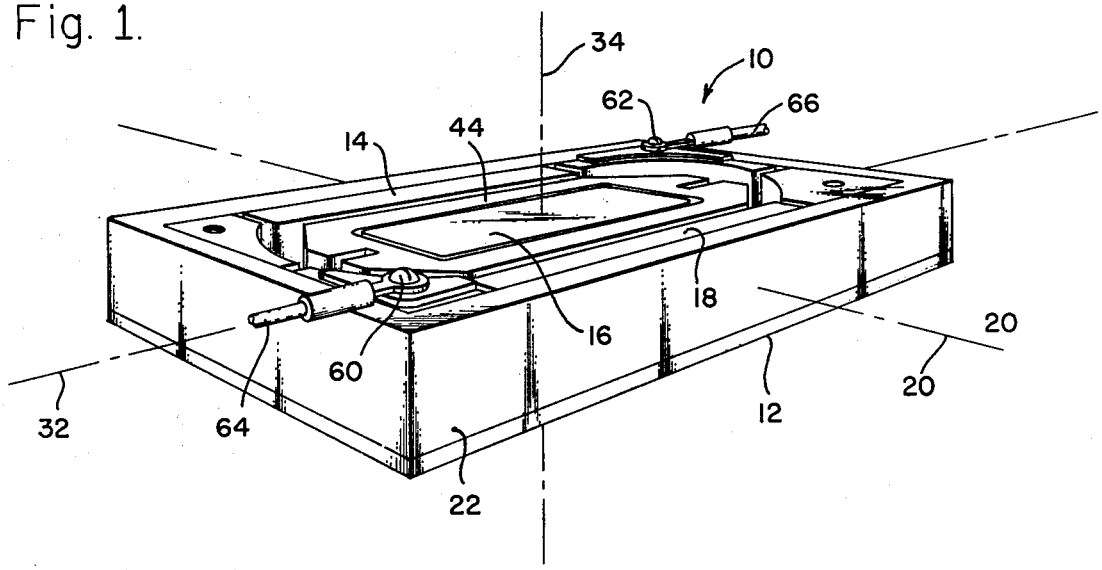
FIG. 1 is a perspective view of a first preferred embodiment of the change of angular acceleration sensor of this invention.
Figure 2:
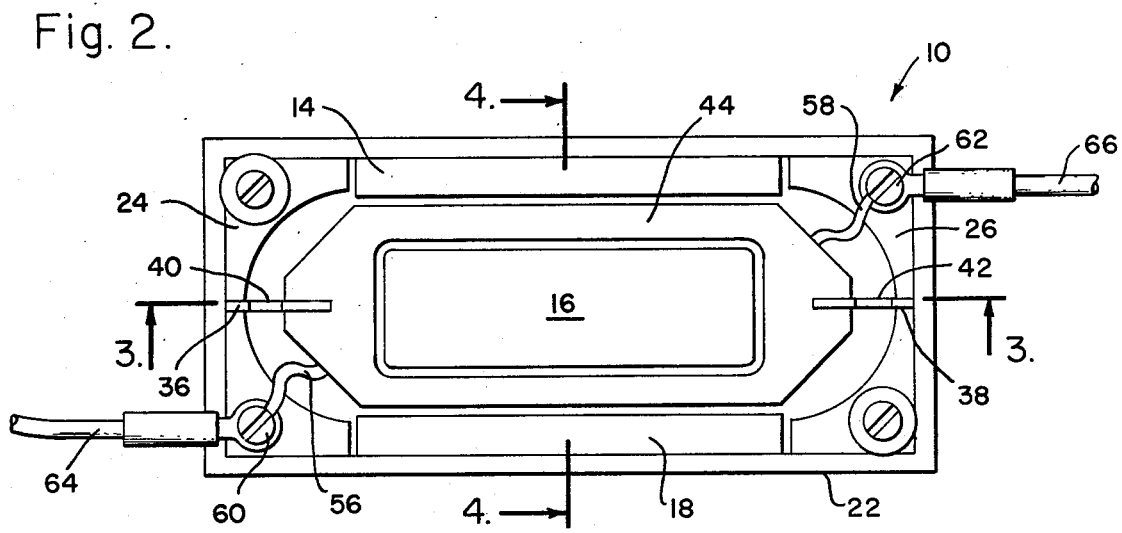
FIG. 2 is a top plan view thereof.

A first preferred embodiment of a sensor in accordance with this invention for detecting the change in rate of angular acceleration is generally indicated at 10 in FIGS. 1-5. The sensor 10 has a base plate 12 of non-magnetic material for mounting of the sensor and for carrying the balance of the sensor parts thereon. The base plate 12 is made of nonmagnetic material so as to not influence the magnetic flux path. A set of magnets 14, 16 and 18 is mounted on the base plate 12. The magnets 14, 16 and 18 are permanent magnets oriented in such a way that the flux thereof through each of the magnets is additive and is in the same direction. The flux is parallel to a transverse axis 20. A magnetic return frame 22 is a rectangular structure of magnetically permeable material which is mounted adjacent the outer edge of the base plate 12 and serves as a magnetic return path.

A set of clamp blocks 24 and 26 is secured on the base plate 12 or is machined as a part of the baseplate and located within the magnetic return frame 22. The clamp blocks are also formed of nonmagnetic material. The clamp blocks 24 and 26 are each respectively sloted with a slot 28 and a slot 30, with the slots lying on a longitudinal, sensitive axis 32. The axis 34 is the upright axis normal to the base plate 12 and normal to the other two axes.

Figure 3:
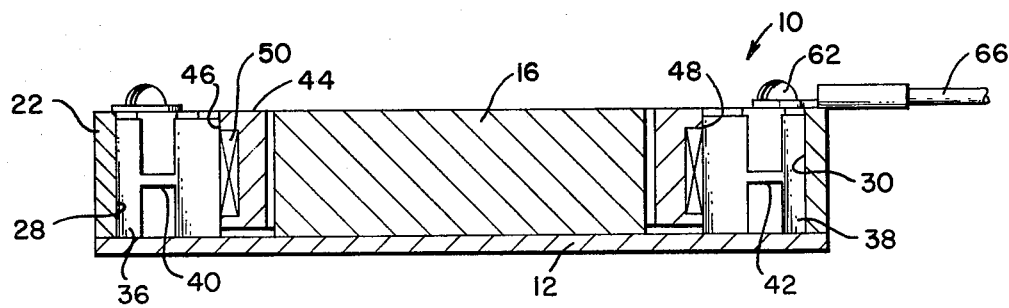
FIG. 3 is a longitudinal sectional view through the sensor taken generally along line 3—3 of FIG. 2.
Figure 4:
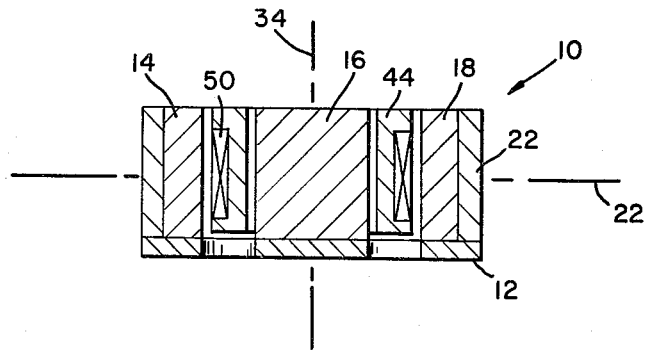
FIG. 4 is a transverse sectional view through the sensor, taken generally along the line 4—4 of FIG. 2.
Figure 5:
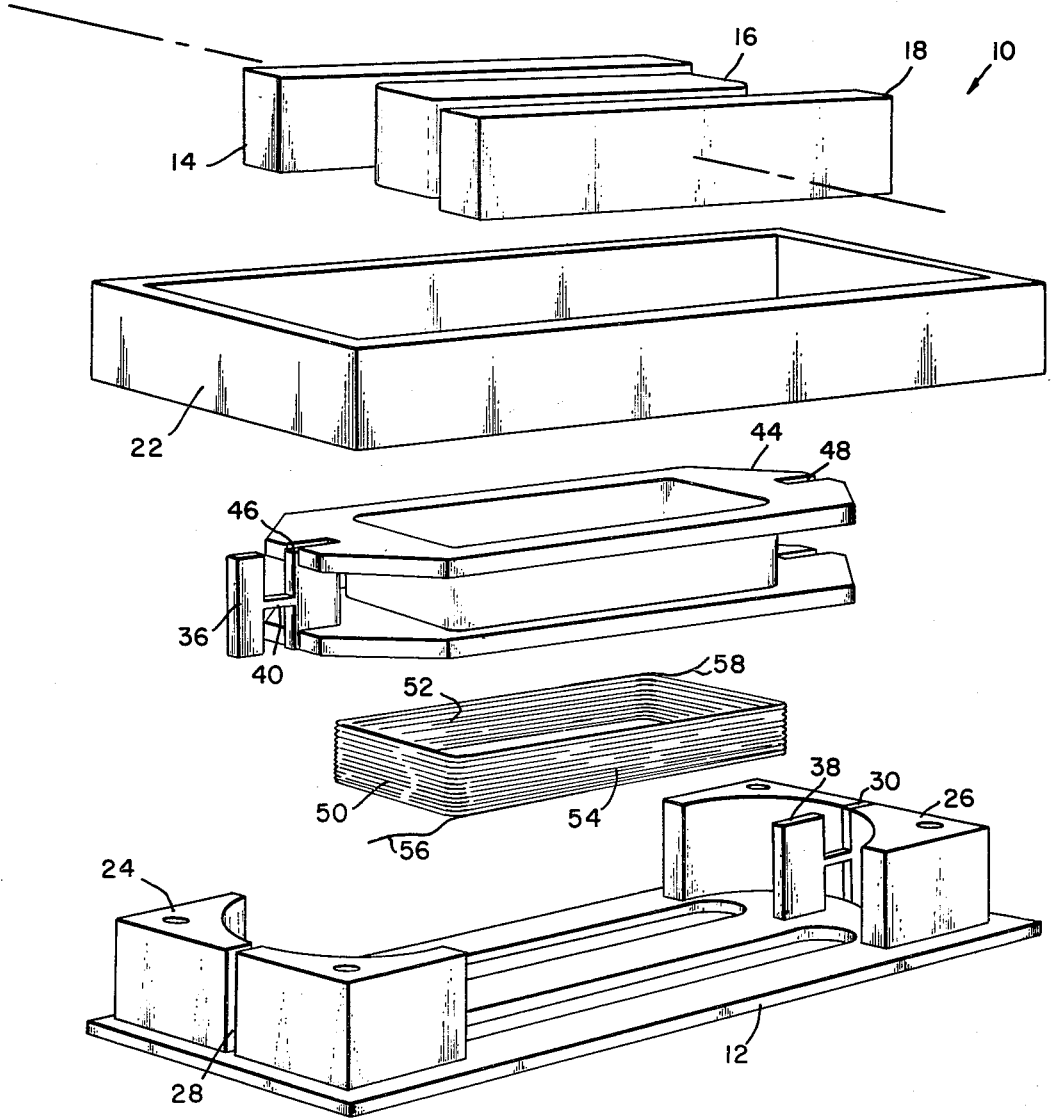
FIG. 5 is an exploded view of the sensor of FIG. 1.

A flexure 36 and a flexure 38 are provided and each is H-shaped, as seen in FIGS. 3 and 5. The flexures 36 and 38 respectively each have a flexing neck 40 and a flexing neck 42. The flexing necks 40 and 42 lie on the sensitive axis 32. The outer ends of the H-shaped flexures 36 and 38 are respectively clamped in the slots 28 and 30.

A rotor 44 is formed of nonmagnetic material and is shaped as a bobbin which embraces the central magnet 16 and lies interiorly of the other two magnets 14 and 18. The rotor 44 is sloted at its ends by a pair of slots 46 and 48 and these slots carry and clamp the other leg of the H-shaped flexures. The rotor 44 is of nonmagnetic metallic material so that it does not influence the flux produced by the three permanent magnets 14, 16 and 18 but serves as a one-turn coil which acts to damp motion of the rotor.

A sensor coil 50 is wound around bobbin 44 so that a leg 52 and a leg 54 extend generally parallel to the sensitive axis 32 and extend generally at right angles to the flux which is substantially aligned with the axis 20 upon response to the rate of angular accelerations. The sensor coil 50 has an appropriate number of turns from a few hundred to a few thousand, so that the output is suitable for connection to a device which has a high impedance input.

A pair of leads 56 and 58 extend from the coil and are connected to a pair of binding posts 60 and 62, respectively. The binding posts 60 and 62 are mounted on the clamp blocks 24 and 26 and are insulated therefrom and are suitable for the electrical attachment of external connections. A pair of electrical lines 64 and 66 are respectively secured to the binding posts 60 and 62 provide for this external connection.

The sensor 10 is responsive to changes in angular acceleration about its sensitive axis 32, and is nonresponsive to linear accelerations on any of its three axes or angular accelerations about its other two axes. Changes in linear acceleration along the sensitive axis 32 cause insignificant motion of the sensing coil 50 in the magnetic field because of the stiffness of the flexures. Changes in linear acceleration along either of the transverse axis 20 or the upright axis 34 may cause some changes in bending of the flexures, but changes in acceleration along the transverse axis 20 does not cause any motion of the sensor coil 50 in the direction of cutting lines of magnetic flux. Changes in linear acceleration along the axis 34 causes both legs of the sensor coil 50 to cut the same magnetic flux lines and thus equal and opposite EMFs are generated, so there is no net coil output.

Similarly, angular acceleration or changes in angular acceleration around the upright axis 34 causes no motion of the coil across the flux lines, and changes in angular acceleration about the tranverse axis 20 cause motion wherein each of the coil legs are cutting the sequal and opposite lines of force so that the internal EMF generation is cancelled. However, changes in angular acceleration around the sensitive axis 32 causes one sensor coil leg to move upward in the magnetic flux while the other leg moves downward so that additive EMFs are generated. In this way, the sensor 10 is sensitive to changes in angular acceleration only around its sensitive axis and is nonsensitive to linear accelerations and to angular accelerations and changes therein around its other two axes. Accordingly, the sensor 10 can accurately sense the changes in acceleration for which it is applied and it rejects sensing of other accelerations and changes. For this reason, the sensor 10 is well-suited to a large number of change of angular acceleration sensing applications.

Figure 6:
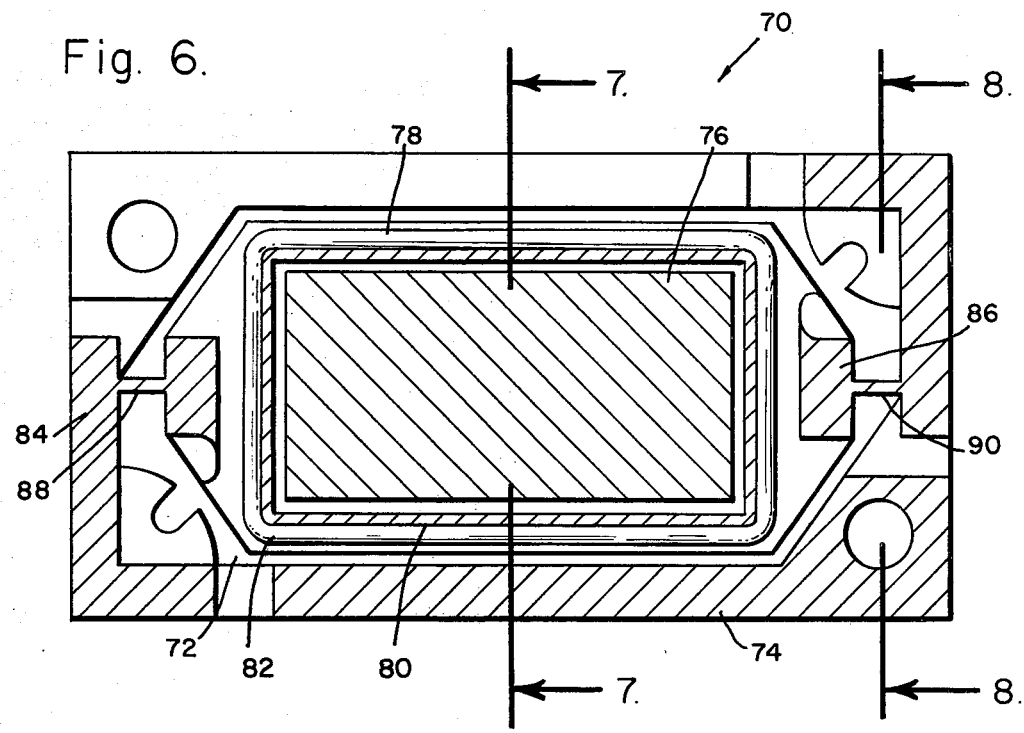
FIG. 6 is a top plan view, with the top cover removed, of a second preferred embodiment of the change of angular acceleration sensor of this invention.
Figure 7:
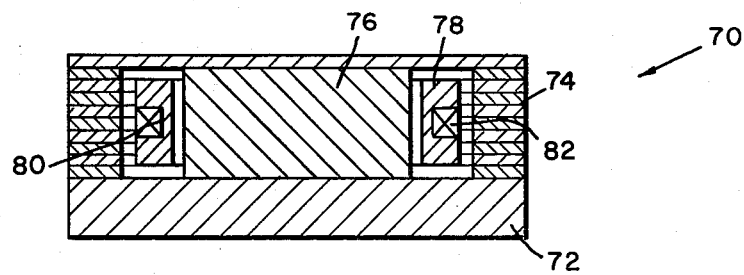
FIG. 7 is a transverse section taken generally along the lines 7—7 of FIG. 6.
Figure 8:
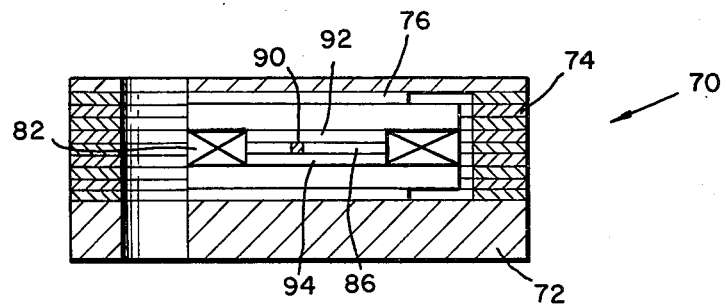
FIG. 8 is a transverse section taken generally along lines 8—8 of FIG. 6.

A second preferred embodiment of the change of angular acceleration sensor is generally indicated at 70 in FIGS. 6, 7 and 8. The sensor 70 has a nonmagnetic baseplate 72 on which is mounted a rectangular magnetic return frame 74. The frame 74 is laminated to reduce current flow with changes in the magnetic field therethrough. A permanent magnet 76 is mounted on the baseplate 72 interiorly of the frame 74. The permanent magnet is arranged so that the top edge as seen in FIG. 6 is one pole and the bottom edge of the magnet is another pole.

A rotor 78 is made of light-weight nonmagnetic material such as aluminum and has a winding groove 80 around its periphery. The rotor 78 embraces the magnet 76. The rotor 78 serves as a one-turn coil for selfdamping. A sensor coil 82 is wound on the rotor 78 in the winding groove 80 and is brought out to terminate similarly to the termination of the coil 50 in FIGS. 1 and 2.

A pair of flexures 84 and 86 support the rotor 78 with respect to the frame and the baseplate of the sensor 70. Flexures 84 and 86 are flat, H-shaped structures which have a pair of flexure neck 88 and 90, respectively. These flexure necks define the sensitive axis, which passes through both the necks, left to right in FIG. 6 and perpendicular to the drawing in FIGS. 7 and 8. Support of the rotor 78 is provided by the flexures, with the outer end being fitted into a slot in the magnetic return frame 74. The inner end of the flexure is inserted into the winding groove 80 and is wedged therein by means of a pair of spacers 92 and 94.

With this construction, it is seen that the same physical advantages are achieved in the sensor 70 as are achieved in the sensor 10, but the sensor 70 has a simpler construction because it employs only one magnet. The flexures permit rotation of the rotor 78 on the axis defined by the flexure necks 88 and 90. The necks are resilient so changes in angular rotation on the sensitive axis occur as a result of change in angular acceleration around the axis.

The legs of the sensor coil 82 which extend parallel to the sensing axis lie at 90 to the magnetic flux lines which extend outward from the magnet to the return frame, which closes the magnetic field path. Thus, the sensor 70 is responsive only to changes in angular acceleration around its sensitive axis and is practically not sensitive to angular accelerations or changes thereof around the other two axes and is not responsive to linear accelerations on any of the three mutually perpendicular axes. Rotation of the rotor on its sensitive axes, caused by changes in acceleration around that axis, cause the long legs of the sensor coil 82 to cut magnetic lines of force, thereby generating a voltage. This voltage is carried out of the sensor and employed as previously described.

This invention having been described in its preferred embodiments, it is clear that it is susceptible to numerous modifications and embodiments within the ability of those skilled in the art and without the exercise of the inventive faculty. Accordingly, the scope of this invention is defined by the scope of the following claims.

What is claimed is:

1. A sensor for sensing the change of rate of angular acceleration of a body, said sensor having a sensitive axis, said sensor comprising:
a base plate for mounting on the body; magnet means for producing a magnetic field at an angle with respect to said axis, said magnet means being mounted on said base plate;
electric coil means having first and second oppositely wound legs at least partially positioned in the magnetic field for producing a voltage in said coil means when said coil means is moved with respect to said magnet means angularly about the sensitive axis; and
mounting means for resiliently rotationally mounting said coil means for resilient rotation about said sensitive axis, said coil mounting means being a torsionally resilient support at each end of said coil means, said torsionally resilient support being secured to said coil means, first and second clamp blocks positioned on said base plate, said torsionally resilient supports being respectively clamped by said clamp blocks so that as the body changes in rotational acceleration about its axis, said rotationally resilient mounting means rotates due to inertia so that said coil legs cut magnetic lines of force to produce an electric signal in said coil means.

2. A sensor for sensing the change of rate of angular acceleration of a body, said sensor having a sensitive axis, said sensor comprising:
a base plate for mounting on the body;
magnet means for producing a magnetic field at an angle with respect to said axis, said magnet means being mounted on said base plate;
electric coil means having first and second oppositely wound legs at least partially positioned in the magnetic field for producing a voltage in said coil means when said coil means is moved with respect to said magnet means angularly about the sensitive axis; said coil means including a one-turn coil for damping; and
mounting means for resiliently rotationally mounting said coil means for resilient rotation about said sensitive axis, said coil mounting means being a torsionally resilient support at each end of said coil means, said torsionally resilient support being secured to said coil means, first and second clamp blocks positioned on said base plate, said torsionally resilient supports being respectively clamped by said clamp blocks so that as the body changes in rotational acceleration about its axis, said rotationally resilient mounting means rotates due to inertia so that said coil legs cut magnetic lines of force to produce an electric field in said coil means.

3. A sensor for sensing the change of rate of angular acceleration of a body, said sensor having a sensitive axis, said sensor comprising:

a base plate for mounting on the body;

magnet means for producing a magnetic field at an angle with respect to said axis, said magnetic means being mounted on said base plate;

electric coil means having first and second oppositely wound legs at least partially positioned in the magnetic field for producing a voltage in said coil means when said coil means is moved with respect to said magnet means angularly about the sensitive axis; and mounting means for resiliently rotationally mounting said coil means for resilient rotation about said sensitive axis, said coil mounting means a torsionally resilient support at each of said coil means, said torsionally resilient support being secured to said coil means, first and second clamped blocks positioned on said base plate, said base plate and said clamp blocks being made of nonmagnetic material, said sensor further including a magnetic return frame to close the magnetic path substantially within said sensor, said torsionally resilient supports being respectively clamped by said clamp blocks so that as the body changes in rotational acceleration about its axis, said rotationally resilient mounting means rotates due to inertia so that said coil legs cut magnetic lines of force to produce an electric signal in said coil means.

* * * * *